Feb. 12, 1957     C. V. McGUIRE     2,780,946
METHOD AND APPARATUS FOR MAKING A MOLDED HONEYCOMB STRUCTURE
Filed March 27, 1952     2 Sheets-Sheet 1
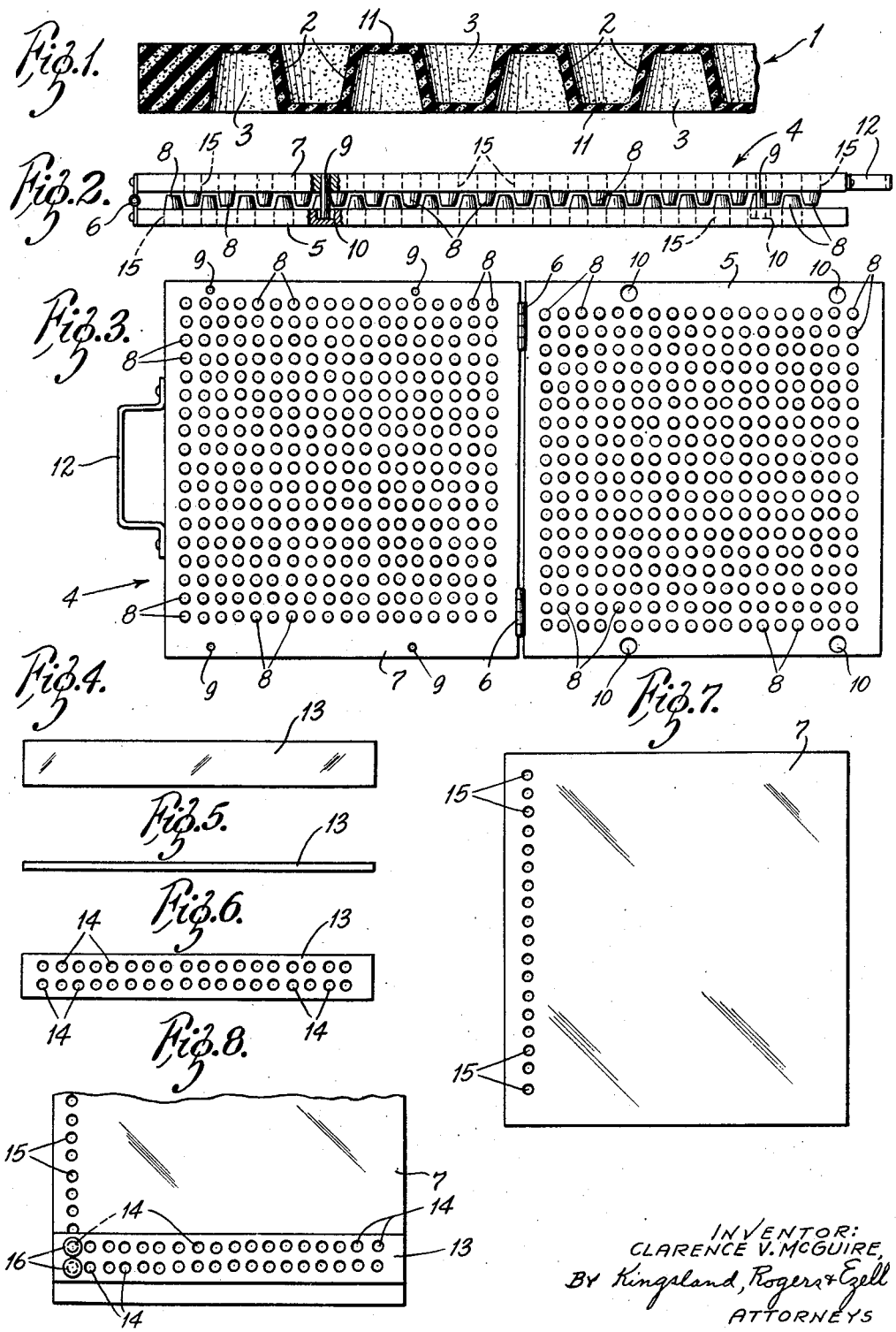
INVENTOR:
CLARENCE V. McGUIRE,
BY Kingsland, Rogers & Ezell
ATTORNEYS Feb. 12, 1957 C. V. McGUIRE 2,780,946
METHOD AND APPARATUS FOR MAKING A MOLDED HONEYCOMB STRUCTURE
Filed March 27, 1952 2 Sheets-Sheet 2
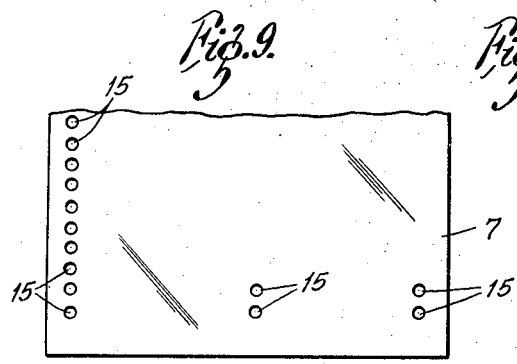
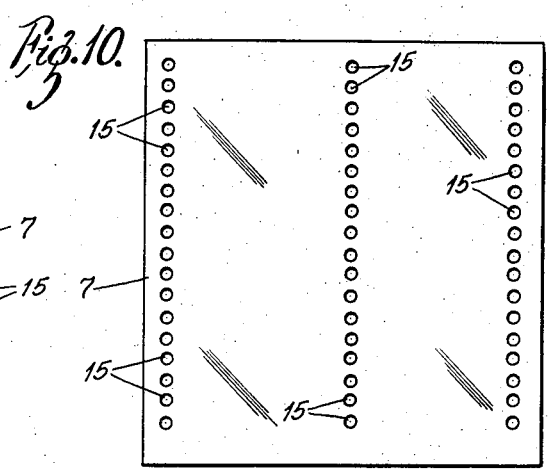
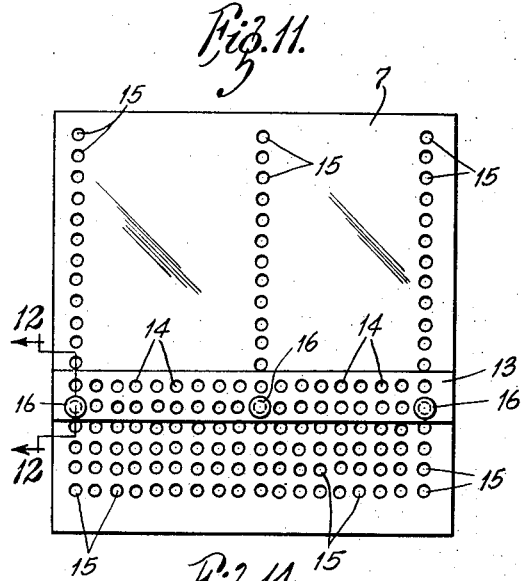
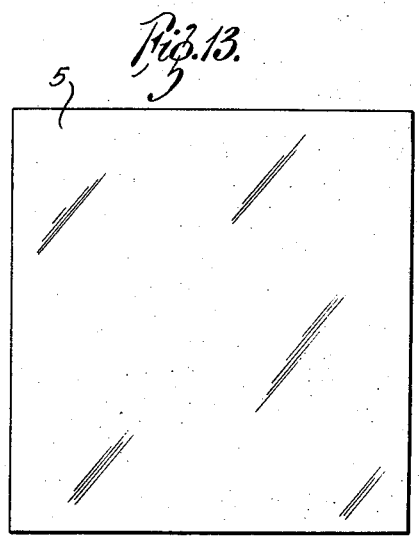
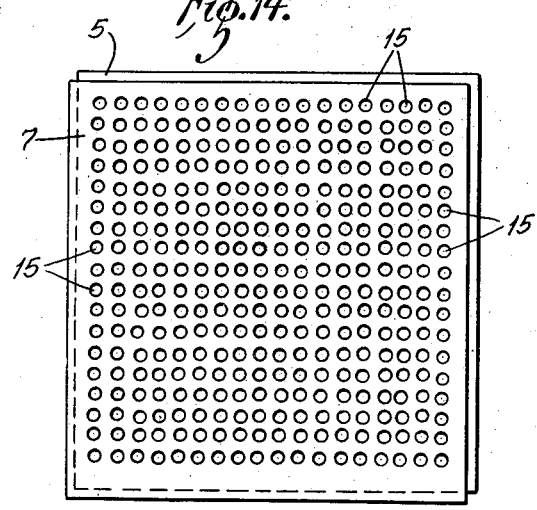
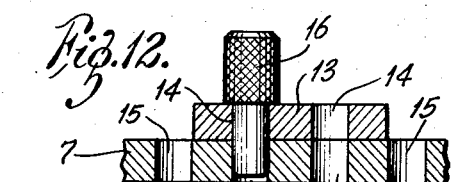
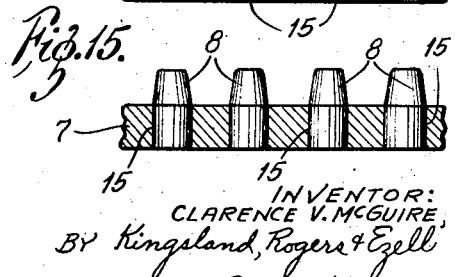
INVENTOR:
CLARENCE V. McGUIRE
BY Kingsland, Rogers & Ezell
ATTORNEYS United States Patent Office 2,780,946
Patented Feb. 12, 1957

2,780,946

METHOD AND APPARATUS FOR MAKING A MOLDED HONEYCOMB STRUCTURE

Clarence V. McGuire, Grosse Pointe, Mich.

Application March 27, 1952, Serial No. 278,985

1 Claim. (Cl. 77—62)

This invention relates to a method and apparatus for making a molded honeycomb structure from rubber or rubber-like synthetic materials, and in particular, it involves a means for making a mold of extremely accurate configuration whereby the walls of the molded honeycomb are of extremely exact and uniform thickness.

Such molded honeycomb structures have a manifold number of uses, but they are particularly well adapted as load bearing structures, and in such connection, they are very well suited for use as shoe insoles. A honeycomb structure made of a composite pneumatic material is disclosed in my former Patent No. 2,189,813, issued February 13, 1940, wherein I disclose a flexible material having sealed air pockets so constructed that a load may be supported on the material almost entirely by air. In the manufacture of the honeycomb structure, it is essential that the walls defining the air pockets be of uniform thickness in order to properly support any load that is placed on the structure. In the past, molded honeycomb structures have, at times, been objected to because of the lack of uniformity in the wall structure which if sufficiently non-uniform tended to cause failure of the material when subjected to a substantial load.

By means of my method and apparatus, I have made it possible to provide a mold which is of an extremely high degree of accuracy, so that a molded honeycomb structure can be produced from the mold which will have walls defining the cell structure of extremely exact and uniform thickness. In preparing the molded honeycomb structure, it has been conventional practice to provide two opposed mold plates with interfitting pins which define an air space or air cell when the mold is charged with the material which is to be molded. It is obvious that in order to prepare a molded honeycomb structure having uniform wall thicknesses that these pins in the mold plates must be uniformly spaced, and in the past this has represented a problem difficult of attainment without using special and expensive jigs and forms. By means of my invention, I have provided a jig strip which is simple and inexpensive to construct and can be employed with a minimum of labor in preparing the mold plate. Further, by use of my jig strip, I have made it possible to space the air defining cells in the mold plate with an extremely high degree of accuracy so as to insure a uniform wall thickness in the molded honeycomb structure produced by the mold.

My jig strip greatly minimizes the expense and labor which has heretofore been required where a master jig was used which corresponded in complete detail to the mold and the pin spacing therein, especially is this saving in expense and labor of extreme importance in the production of a mold or molds for sheets of honeycomb material containing large numbers of cells (for example sheets having 5,000 to 9,000 honeycombed cells molded in each surface thereof).

Accordingly, it is an object of this invention to provide a method and apparatus for preparing a molded honeycomb structure having a uniform wall thickness.

It is a further object of this invention to provide a simple jig strip which can be easily employed with a minimum of labor to manufacture a mold plate according to the process of this invention.

Yet another object of this invention is to provide a method for spacing pins in a mold plate which are positioned with respect to one another uniformly and with an extremely high degree of accuracy.

Yet another object of this invention is to provide a jig in strip form made of readily available material which can be used in a number of sequential operations to lay out a mold plate or plates of exacting design and accuracy.

Reference may now be had to the accompanying drawings illustrating a preferred embodiment of my invention of which a detailed description is given below.

In the drawings:

Fig. 1 is a cross-sectional view of the molded honeycomb structure produced by the practice of my invention;

Fig. 2 is a side view partly in section showing the mold plate of this invention adjusted in the molding position;

Fig. 3 is a plan view on a reduced scale, of a mold plate of the molding device in open position;

Fig. 4 is a plan view of a strip of material which may be used in making my jig strip;

Fig. 5 is a side view of the strip shown in Fig. 4;

Fig. 6 is a plan view showing the jig strip made from the material of Fig. 4;

Fig. 7 is a plan view of one of my mold plates at a preliminary stage of construction;

Fig. 8 is a fragmentary plan view of the mold plate of Fig. 7 showing the application of my jig strip;

Fig. 9 is a fragmentary plan view of a further stage of construction of the mold plate resulting from the use of my jig strip;

Fig. 10 is a plan view of the mold plate showing a further stage of construction;

Fig. 11 is a plan view showing the use of my jig strip on the mold plate at a further stage of construction;

Fig. 12 is an enlarged sectional view taken along the line 12—12 in Fig. 11 showing means for positioning the jig strip on the mold plate;

Fig. 13 shows a blank mold plate prior to the operation shown in Fig. 14;

Fig. 14 shows a plan view of a completed mold plate constructed by the operations shown in Figs. 7–11, inclusive, and placed over the blank mold plate of Fig. 13 in such a manner that it can be used as a jig to insure that the pins in the bottom mold plate will be so arranged as to interfit perfectly with the pins of the superimposed mold plate when the two mold plates are used together in a mold press as shown in Fig. 3;

Fig. 15 is an enlarged fragmentary sectional view of a mold plate and pins associated therewith.

It is to be realized that these drawings are for purpose of illustration only since obviously these drawings cannot convey the very great number of holes and/or mold pins which may actually be contained in mold plates required for production of honeycomb material.

Referring to Fig. 1, the element 1 indicates a molded honeycomb structure adapted to be produced from the mold forms of this invention. This molded honeycomb structure has side walls 2 of uniform thickness which define air spaces or air cells 3. It is to be realized that these air spaces conform to the shape of the mold and can be made to conform to any desired configuration.

The mold device of my invention is shown generally at 4 in Figs. 2 and 3 and is shown as comprising mold plates 5 and 7 connected together by a hinge 6 at one end. These mold plates are shown as being provided with pins 8 which are adapted to interengage when the mold plates are adjusted to the operating position shown in Fig. 2. The mold plate 7 is further provided with four studs 9 along its outer edges which are adapted to engage recesses 10 in mold plate 5 so as to limit the closure of the mold plate to that shown in Fig. 2, so that the molding medium which may be a rubber latex composition, a synthetic resin or the like may flow over the free end of pins 8 to define an end wall 11 of the molded honeycomb structure shown in Fig. 1. A handle 12 is provided at one end of mold plate 7 so that the mold device may be conveniently carried.

A blank strip of material is shown at 13, and this is the stock from which my jig strip is made. This jig strip is shown in completed form in Fig. 6 as comprising two parallel rows of spaced holes 14. In the preliminary stage of construction of the mold plate 7, the plate is drilled with a straight line of spaced holes 15, as shown in Fig. 8 at one side of the mold plate, and these holes are adapted to receive pins 8 in the final stage of construction. The jig strip 13 is adapted to be held in proper position on mold plate 7 by inserting dowels 16 to jig strip holes 14 and the holes 15 of the mold plate, as shown in Figs. 8, 11 and 12.

The method for constructing my novel jig strip and mold device comprises the following sequential operations. The blank jig strip 13 is placed upon the table of a conventional vertical mill (not shown) provided with a calibrated transverse screw for moving the mill table relative to the drill of the vertical mill. One row of holes 14 is then drilled in a straight line along the length of the jig blank 13 by properly positioning the setting of the mill table at preset, equally spaced, calibrated positions. A second row of parallel holes 14, spaced a distance from the first row equal to the aforementioned settings, is then drilled using the same calibrations as employed for the first row of holes. It is apparent that by this operation, any one hole 14 is spaced the same distance from the corresponding hole in the neighboring parallel row, as it is from the immediate hole adjacent to it on either side in the same row as the hole in question.

The blank mold plate 7 is then placed on the table of the vertical mill and is drilled with a series of holes 15 in a straight row at one side using the same calibration of the transverse screw of the vertical mill as was used in drilling the holes 14 of the jig strip 13, so as to insure that these holes are equally spaced and correspond to the same spacing as that of holes 14 in the jig plate. Alternatively, the jig strip 13 may be used in spotting and drilling these holes to decrease the labor involved.

The jig strip 13 is then placed on mold plate 7 in the position shown in Fig. 8 and is secured to the mold plate by means of dowel pins 16 which engage holes 14 in the jig plate and holes 15 in the mold plate. A row of holes 15 is spotted and drilled from the jig plate in the center of the mold plate and at one side thereof, as shown in Fig. 9, and this is done to insure that a transverse spacing is obtained which corresponds exactly to the spacing of the respective holes in the first named row of holes at the side of the mold plate 7. The newly started center and side row of holes 15, shown in Fig. 9, is completed, as shown in Fig. 10, by placing the mold plate upon the vertical mill as mentioned above and completing the drilling operation by using the same spacing between holes as obtained by the calibrated transverse screw, as described above, so that the spacing between the holes in the individual rows, as shown in Fig. 10, is the same in all cases. Or, if desired, the jig plate 13 may be shifted to a vertical position on the newly started center and side row of holes shown in Fig. 9 to spot and complete the rest of the holes in the vertical rows to obtain the partially completed mold plate of Fig. 10. Obviously this latter operation requires less labor than using the vertical mill with the necessity of advancing the transverse feed screw of the vertical mill for each hole spacing to a preset calibrated position.

Using the partially completed mold plate of Fig. 10, the jig plate 13 is first secured at the bottom of the mold plate at right angles to the three rows of holes and secured by placing dowel pins 16 so as to engage the holes of the jig plate and the corresponding holes of the mold plate at the side and center rows. A transverse row of holes is then spotted in the mold plate 7 from the holes 14 in the jig plate. After this operation of spotting one complete set of two parallel rows is consummated, the jig strip is then advanced another two rows and secured by the use of the dowel pins as mentioned above. The operation is then repeated over and over again until the jig strip has been advanced to the top of the mold plate 7 so as to completely spot and enable precise drilling of all the holes in the mold plate. The method for securing the jig strip to the mold plate by the use of the dowel pins 16 is shown in Fig. 12.

The mating mold plate 5, to the completed mold plate 7, is shown in blank form in Fig. 13. To insure that holes are spotted and drilled in this blank mold plate 5 the previously prepared mold plate 7 is used as a master jig in order to make certain that holes will be drilled in this mold plate 5 exactly between the centers of the hole in the corresponding mate, that is mold plate 7.

To carry out this process, the distance between the centers of the immediately adjacent holes 15 and mold plate 7 is first measured off. Once this has been done the mold plate 7 is placed directly on top of the blank mold plate 5, so as to coincide exactly with it. The mold plate 7 is then lowered vertically a distance corresponding exactly to one-half the aforementioned measured distance between the immediately adjacent hole centers and is also shifted horizontally the same distance. The completed operation is shown in Fig. 14, and from this position, holes may be spotted on and drilled in the mold plate 5, and it can readily be seen that when the two mold plates are superimposed upon one another so as to have their edges exactly coincide, the holes in each mold plate will fall between the corresponding holes of the mating mold plate so that there is an extremely exact and uniform spacing between these holes. The holes 15, in mold plates 5 and 7, are then provided with pins 8 which may have a free end of a frusto-conical form as shown in Fig. 15. The completed mold plates 5 and 7 are then provided with hinges 6, as shown in Fig. 3, and it is manifest that by the above-mentioned sequential operations, a mold plate device has been provided in which the mold pins are so spaced that they are positioned in uniform and exact distance from the immediately adjacent pins when the mold plates are in the operative molding position.

The molding operation itself may be accomplished from my novel molding device in known and conventional manner by charging the mold device with an appropriate molding medium, such as rubber composite material, synthetic resins and the like, and subjecting the mold device to pressure and increased temperature, if required. By this operation, a molded honey-comb structure, shown in Fig. 1 as element 1, will be produced which will have side walls of an extremely exact and uniform thickness so that no failure of the structure will occur in any one locality due to unnaturally thin walls when a load is placed upon the medium. By virtue of uniform walls the possibility is obviated of having punctured cell walls, thus creating within the material the defect of air escaping from cell to cell within the completed honeycomb structure and possibly weakening the structure as a result. If desired, a sealing sheet may be disposed on the top and the bottom of the molded honeycomb structure so as to seal in the air spaces 3, and this can be done in a conventional manner as disclosed in my aforementioned Patent No. 2,189,813. It is manifest that such a molded honeycomb structure, having substantially uniform wall thicknesses, can be conveniently used in a manifold number of fields, as well as for shoe insoles, such as for refrigeration insulation, load-bearing structures in aircraft having a minimum of weight, boxcars, in the building trades and the like.

By means of my novel jig strip and process, I have made it possible to drill holes in the mold plate in a minimum number of operations and in such a way as to insure accuracy in spacing the holes a uniform distance from one another, and have, at the same time, substantially reduced the equipment outlay in such an operation.

It will be obvious that certain changes and modifications may be made within the teachings of this invention as will readily appear to those skilled in the art, and it is desired that this invention be limited only as set forth in the appended claims.

What is claimed is:

A method of making a mold plate having multiple pins seated in a checkerboard pattern of multiple equidistant holes of the same diameter, comprising forming a first rectilinear vertical row of circular holes of uniform diameter in said plate spaced equidistantly apart from one another, forming a circular starting hole for a second rectilinear vertical row of circular pinholes of the same diameter as the holes of the first vertical row with its center disposed on a horizontal line extending from the center of one of the holes of said first vertical row perpendicularly thereto at a distance therefrom equal to a multiple of the hole spacing thereof, forming a second rectilinear vertical row of equidistantly-spaced circular pinholes of the same diameter as the holes of the first vertical row extending from said starting hole parallel to the first vertical row thereof, preparing a jig strip with a rectilinear horizontal row of circular guide holes of substantially the same diameter as the previously-mentioned pin holes spaced equidistantly apart from one another at the same spacing as the vertical row holes, temporarily securing certain holes of said jig strip in alignment with corresponding holes in said first and second vertical rows whereby to position the row of jig strip holes in a horizontal line perpendicular to said vertical rows of holes, passing a circular machining tool of substantially the same diameter as the holes of the two vertical rows through the jig strip holes other than the aligned jig strip holes into said circular plate to form plate holes in a first horizontal row thereof, shifting said jig strip vertically parallel to its previous position into alignment of its said certain holes with another set of corresponding holes in said first and second vertical rows respectively, passing said circular machining tool of substantially the same diameter as the holes of the two vertical rows through the jig strip holes other than the aligned jig strip holes into said plate to form circular plate holes in a second horizontal row thereof, and repeating the aforesaid shifting and aligning and passing of the said circular machining tool through said jig strip holes into said plate to complete the checkerboard pattern of said plate holes.

References Cited in the file of this patent

UNITED STATES PATENTS

| | | |
|---|---|---|
| 447,014 | Pryibil | Feb. 24, 1891 |
| 910,330 | Wait | Jan. 19, 1909 |
| 1,244,112 | Mackle | Oct. 23, 1917 |
| 2,358,962 | Cunningham | Sept. 26, 1944 |
| 2,364,036 | Mackay et al. | Nov. 28, 1944 |